Oct. 17, 1950        C. J. HIRSCH        2,526,233
ELECTRIC MOTOR FOLLOW-UP CONTROL SYSTEM
Filed July 11, 1947
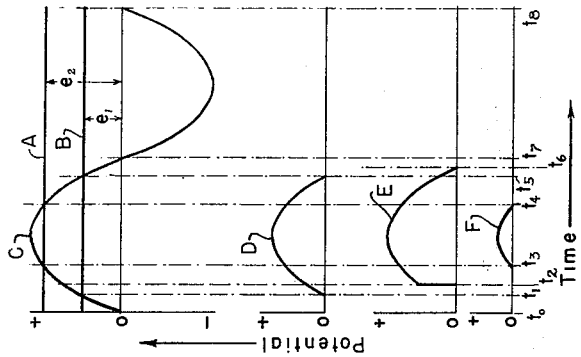
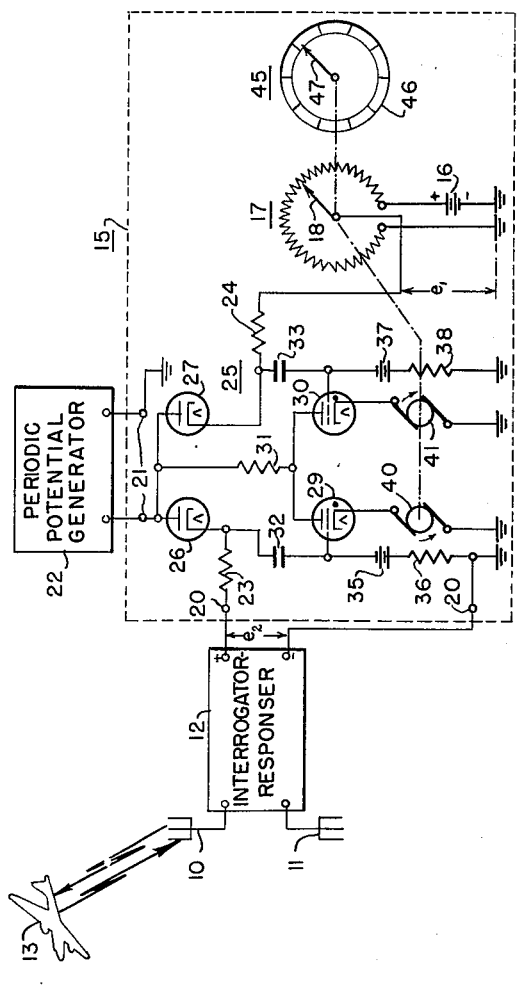
*INVENTOR.*
CHARLES J. HIRSCH
BY *John Q. Harvey*
ATTORNEY

Patented Oct. 17, 1950

2,526,233

UNITED STATES PATENT OFFICE 2,526,233

ELECTRIC MOTOR FOLLOW-UP CONTROL SYSTEM

Charles J. Hirsch, Douglaston, N. Y., assignor to Hazeltine Research, Inc., Chicago, Ill., a corporation of Illinois Application July 11, 1947, Serial No. 760,204

9 Claims. (Cl. 318—28)

This invention relates to control systems and, particularly, to control systems for adjusting the magnitude of a first electrical effect toward or to equality with that of a second electrical effect. Although the invention has wide application, it is particularly useful in connection with systems employing radiant energy for measuring distances electrically and hence will be described in that environment.

Some systems heretofore proposed for measuring distances by means of radiant energy derive in the output circuit of a wave-signal receiver thereof a unidirectional potential having a magnitude which is directly proportional to the distance being measured. To provide a direct indication of the measured distance, the distance-measuring system includes a control system having an electrical bridge arrangement by which to compare the magnitude of the derived unidirectional potential with that of a unidirectional potential of adjustable magnitude. When the potentials being compared are unequal in magnitude, the bridge is unbalanced. A motor-driven device is energized in response to any unbalance of the bridge and is effective, when energized, to adjust the magnitude of the adjustable unidirectional potential to equality with that of the abovementioned derived unidirectional potential, thereby restoring the balance of the bridge. The magnitude of the adjustable unidirectional potential thus provides an indication of the measured distance.

A control system of the type described above ordinarily includes a pair of similarly disposed electron-tube amplifier channels which are connected between corresponding portions of the bridge arrangement and the motor of the motor-driven device. To provide a proper operation of the distance-measuring system, it is important that these channels have substantially identical gain characteristics at all times and under all normal operating conditions. Otherwise the accuracy of distance indication is impaired. Equality of channel gains is not always easy to realize in practice without frequent readjustment, particularly over extended periods of operation. This is due, in part, to the fact that the electrical characteristics of corresponding electrical components of the channels vary unequally over a period of time. This is particularly true of the amplifier tubes. Furthermore, should it become necessary to replace one of the amplifier tubes, the previous calibration of the bridge arrangement is no longer accurate unless the replacement tube has electrical characteristics exactly corresponding to those of the tube replaced. In practice, this possibility is rather remote.

It is an object of the invention, therefore, to provide a new and improved control system, for adjusting the magnitude of a first electrical effect toward equality with that of a second electrical effect, which avoids one or more of the above-mentioned disadvantages and limitations of prior such systems.

It is another object of the invention to provide a new and improved control system of the type mentioned which is relatively simple in construction yet one characterized by high reliability of operation over relatively long time intervals without the need of frequent adjustment thereof.

It is a further object of the invention to provide a new and improved control system which accomplishes the same end result as the above-described control system without requiring balanced amplifier channels.

It is yet another object of the invention to provide a new and improved control system, for adjusting the magnitude of a first electrical effect toward equality with that of a second electrical effect, which while providing high accuracy of control is not critical as to adjustment.

In accordance with the present invention, a control system comprises means for supplying a first electrical effect of adjustable magnitude, an input circuit adapted to have applied thereto a second electrical effect, and an input circuit adapted to have applied thereto only a third electrical effect having a magnitude which varies, during an operating interval, continuously with time in a predetermined manner over a range of magnitudes including the magnitudes of both the first and the second electrical effects. The control system also includes a control network, responsive to the three electrical effects and having an operation which is initiated only by the third electrical effect when the magnitude thereof has a predetermined relationship with respect to the magnitude of at least one of the aforesaid first and second electrical effects for adjusting the magnitude of the first electrical effect toward equality with that of the second electrical effect.

For a better understanding of the present invention, together with other and further objects thereof, reference is had to the following description taken in connection with the accompanying drawing, and its scope will be pointed out in the appended claims.

Referring now to the drawing, Fig. 1 is a circuit diagram, partly schematic, of a radiant-energy distance-measuring system which includes a control system embodying the present invention in a particular form; and Fig. 2 comprises graphs utilized in explaining the operation of this control system.

Referring now more particularly to Fig. 1 of the drawing, the radiant-energy distance-measuring system includes an antenna system 10, 11 which is coupled to an interrogator-responser 12 of conventional construction, the details of which are well known in the art so that a detailed description thereof is unnecessary. Briefly, however, the interrogator-responser includes a transmitter for transmitting wave-signal interrogating pulses to a distant object, for example an aircraft 13, the distance of which from the interrogator-responser 12 is to be measured. The aircraft 13 carries a conventional transpondor which receives each interrogating pulse and responds thereto by transmitting a reply wave-signal pulse. Unit 12 also includes a receiver for receiving the reply wave-signal pulses from the aircraft 13. Interrogator-responser 12 is adapted to develop across the output terminals thereof a control effect, specifically a unidirectional output potential designated $e_2$, having a magnitude proportional to the round-trip propagation time between unit 12 and the aircraft 13 and, hence, a magnitude which is related to the distance therebetween. The output terminals of the interrogator-responser are connected to a control system 15 embodying the present invention.

The control system 15 includes means for supplying a first electrical effect or potential of adjustable magnitude, this means comprising a source 16 of unidirectional potential, such as a battery, connected to the end terminals of a potentiometer 17. The battery 16 is one which is capable of developing a substantially constant output voltage for application to the end terminals of the potentiometer 17. The potential of adjustable magnitude previously mentioned, and designated $e_1$, is developed between the rotary arm 18 of the potentiometer and one terminal thereof. The control system also includes an input circuit adapted to have applied thereto a second electrical effect having a magnitude which may vary over a period of time. This input circuit comprises a pair of input terminals 20, 20 which are coupled to the output terminals of the interrogator-responser 12 to have applied thereto the above-mentioned unidirectional potential $e_2$.

The control system 15 also includes an input circuit adapted to have applied thereto a third electrical effect having a magnitude which varies, during an operating interval, continuously with time in a predetermined manner over a range of magnitudes including the magnitudes of both the first and the second potentials $e_1$ and $e_2$. This input circuit comprises a pair of terminals 21, 21 which are adapted to be connected to a periodic potential generator 22 which may generate a potential of saw-tooth or sinusoidal wave form but which, for purposes of the present description, is assumed herein to generate a sinusoidal potential. Generator 22 thus develops an alternating output potential having a value which periodically exceeds that of the unidirectional potentials $e_1$ and $e_2$. The periodicity of this potential is substantially greater than the highest expected periodicity of variation of the potential $e_2$.

Control system 15 further includes a control network, responsive to the three electrical effects and having an operation which is initiated only by the potential from the generator 22 each time that the magnitude thereof has a predetermined relationship with respect to the magnitude of at least one of the potentials $e_1$ and $e_2$ for adjusting the magnitude of the potential $e_1$ toward equality with that of the potential $e_2$. This means comprises an arrangement designated generally by the reference character 25 and includes a pair of diode rectifier devices 26 and 27, the anodes of which are connected together and are also connected to one terminal of the generator 22. The cathode of the rectifier device 26 is connected through a resistor 23 to one of the output terminals of unit 12 while the cathode of the rectifier device 27 is connected through a resistor 24 to the rotary arm 18 of the potentiometer 17. The anodes of the rectifier devices 26 and 27 are also connected through a resistor 31 to the anodes of a pair of electron-discharge devices 29 and 30. These devices are preferably of the gas-filled type to provide a relatively large flow of energy therethrough. The cathode of the rectifier device 26 is connected to the control electrode of the discharge device 29 through a coupling condenser 32 and the cathode of the rectifier device 27 is similarly connected through a coupling condenser 33 to the control electrode of the discharge device 30. The control electrode of discharge device 29 is connected to ground through a unidirectional biasing source 35, such as a battery, and a grid resistor 36. The control electrode of discharge device 30 is also connected to ground through a battery 37 and a grid resistor 38. The cathode of the discharge device 29 is connected to ground through a direct-current motor 40 which is adapted to rotate in a predetermined direction, for example in a clockwise direction, when energized. The cathode of the discharge device 30 is connected to ground through a similar direct-current motor 41 which is arranged to rotate in the opposite, or counterclockwise, direction when the device 30 is conductive. The rotors of the motors 40 and 41 are mechanically coupled to each other, as represented by the broken line, and are coupled to the shaft of the rotary arm 18 of the potentiometer 17.

The control system also includes means coupled to the potentiometer 17 for indicating the magnitude of the potential $e_2$ when the potentials $e_1$ and $e_2$ are adjusted substantially to equality. This means comprises an indicator 45 including a suitable fixed scale 46 and a pointer 47 which is rotatable with respect to the scale and is mechanically coupled to the rotary arm 18 of the potentiometer 17 as indicated by the broken line. While the indicator 45 has been represented as separate from the potentiometer 17, it will be manifest that the two devices may be combined, if desired in a unitary structure.

Considering now the operation of the distance-measuring system including the control system just described, and referring to the curves of Fig. 2, a wave-signal interrogating pulse is transmitted by the interrogator-responser 12 to the aircraft 13 and a reply signal is transmitted or returned thereby. This reply signal is intercepted by the antenna system 10, 11 and there is developed in the output circuit of unit 12 a unidirectional potential $e_2$ having a magnitude which is proportional to the distance between unit 12 and the aircraft 13. This potential is represented by curve A of Fig. 2. It will be assumed that the position of the rotary arm 18 of the potentiometer 17 is such at this time that the unidirectional potential $e_1$, represented by curve B, between the arm and ground is somewhat less than the output potential $e_2$ of unit 12. It will also be assumed that at time $t_0$ the rectifier devices 26 and 27 are in a non-conducting state due to the respective unidirectional potentials $e_2$ and $e_1$ applied thereto and that the discharge devices 29 and 30 are also nonconductive by virtue of the hold-off biases applied to the control electrodes thereof from the respective bias sources 36 and 37.

The periodic potential generator 22 applies to the rectifier devices 26 and 27 an output potential, represented by curve C, which varies sinusoidally over a range of magnitudes including the magnitudes of the unidirectional potentials $e_1$ and $e_2$. Under the assumed conditions mentioned above, at time $t_1$ the magnitude of the sinusoidal potential applied to the anode of the rectifier device 27 equals and thereafter exceeds the potential $e_1$ applied to the cathode of this device. The latter thereupon becomes conductive and, during the interval $t_1$—$t_5$, there is developed across the resistor 24 a voltage having the wave form represented by curve D. At time $t_2$ the voltage developed across the resistor 24, and applied through the coupling condenser 33 to the control electrode of the discharge device 30, has a magnitude which exceeds the critical bias required to maintain device 30 in a nonconducting state. The latter thereupon becomes conductive and a relatively large value of space current flows therethrough. A unidirectional potential, having the wave form represented by curve E, is consequently applied during the interval $t_2$—$t_6$ as a control effect or energizing potential to the direct-current motor 41. This control effect terminates at time $t_6$ just prior to the end at time $t_7$ of the positive half cycle of the potential generated by unit 22. Deionization of device 30 occurs shortly thereafter and it returns to its original nonconductive state.

At time $t_3$ the potential applied to the anode of the rectifier device 26 from the generator 22 is equal to and thereafter exceeds the bias potential $e_2$ applied to the cathode of this device. The device 26 thereupon becomes conductive and a potential is developed across the resistor 23 during the period $t_3$—$t_4$, as represented by curve F. This potential is applied through the coupling condenser 32 to the control electrode of the discharge device 29. Although the magnitude of the hold-off bias applied to the input electrodes of discharge device 29 by the battery 35 is exceeded shortly after time $t_3$ by the magnitude of the potential applied through the coupling condenser 32, the discharge device 29 effectively remains in its nonconducting state. This is due to the well-known inherent difficulty encountered when endeavoring to get two electron-discharge devices of the gas-filled type to operate or discharge in parallel. Also the reduced anode potential of the discharge devices 29 and 30 due to the voltage drop across the anode resistor 31 when device 30 becomes conductive further prevents the discharge device 29 from becoming conductive during the interval $t_3$—$t_4$. Consequently only one of the motors, specifically the motor 41, under the assumed conditions, is responsive at some time during the interval $t_0$—$t_7$ to the control effect, represented by curve E of Fig. 2. Motor 41 thereupon rotates in a clockwise direction and develops an adjusting force which is applied to the rotary arm 18 of the potentiometer 17. This moves the arm 18 in a direction to increase the potential $e_1$. Shortly after the application of the pulse of energy to the motor 41, it begins to rotate at a slower speed and tends to come to rest.

During the succeeding interval $t_7$—$t_8$ corresponding to the negative half cycle of the potential applied to the rectifier devices 26 and 27 by the generator 22, the polarity of this potential is such that these devices are not conductive and the motors 40 and 41 are not energized. However, on succeeding positive half cycles of the potential of the generator 22, the operation described above in connection with the first positive half cycle is repeated and the motor 41 continues to be intermittently energized until it has moved the potentiometer arm 18 to a position where the voltage $e_1$ is increased to a value substantially equal to the value of the voltage $e_2$.

When the voltage $e_1$ is adjusted to equality with the voltage $e_2$, each positive half cycle of the potential applied to the control system 15 from the generator 22 may thereafter cause either one of the discharge devices 29 or 30 to be rendered conductive so that either the motor 40 or the motor 41 is energized in the general manner previously explained. This causes the arm 18 to be rotated a slight distance in a direction slightly to disturb the equality of the potentials $e_1$ and $e_2$. Thus assuming that the discharge device 29 becomes conductive at this time, it then applies a voltage pulse to the motor 40, thereby causing the potentiometer arm 18 to be rotated slightly in a counterclockwise direction. The voltage $e_1$ then becomes slightly less than the voltage $e_2$ so that on the next succeeding positive half cycle of the potential of the generator 22, the operation initially described is repeated and the motor 41 operates the potentiometer arm 18 slightly and in a direction which tends again to restore equality of the potentials $e_1$ and $e_2$. Thus a series of unidirectional control pulses are applied to one or the other of the motors 40 and 41 continuously to maintain substantial equality between the magnitudes of the potentials $e_1$ and $e_2$ as the latter may vary from time to time in accordance with the distance measurement. It is apparent from this that the indicator 45 continuously provides the desired indication of the measured distance between the unit 12 and the aircraft 13.

While the operation has been explained in connection with potential $e_2$ of fixed magnitude, it will be apparent that a similar operation results when the potential $e_2$ varies at any periodicity which is appreciably less than the periodicity of the periodic potential of the generator 22. Although operation of the control system has been described on the assumption that the generator 22 generates a potential of sinusoidal wave form, it will be manifest that a saw-tooth or other recurrent potential generator may be employed in lieu thereof so long as the potential developed by the generator has a magnitude which varies over a range of magnitudes including those of both the potentials $e_1$ and $e_2$.

It will be apparent from the foregoing description that a control system embodying the present invention possesses the important and unique advantages that it is of relatively simple construction, does not require the use of amplifier circuits which are critical as to adjustment, does not require readjustment after the replacement of electron tubes having different electrical characteristics, and yet affords reliable and highly accurate operation over relatively long periods of time.

While there has been described what is at present considered to be the preferred embodiment of this invention, it will be obvious to those skilled in the art that various changes and modifications may be made therein without departing from the invention, and it is, therefore, aimed to cover all such changes and modifications as fall within the true spirit and scope of the invention.

What is claimed is:

1. A control system comprising: means for supplying a first electrical effect of adjustable magnitude; an input circuit adapted to have applied thereto a second electrical effect; an input circuit adapted to have applied thereto only a third electrical effect having a magnitude which varies, during an operating interval, continuously with time in a predetermined manner over a range of magnitudes including the magnitudes of both said first and said second electrical effects; and a control network, responsive to said three electrical effects and having an operation which is initiated only by said third electrical effect when the magnitude of said third electrical effect has a predetermined relationship with respect to the magnitude of at least one of said first and said second electrical effects for adjusting the magnitude of said first electrical effect toward equality with that of said second electrical effect.

2. A control system comprising: means for supplying a first electrical potential of adjustable magnitude; an input circuit adapted to have applied thereto a second electrical potential; an input circuit adapted to have applied thereto only a third electrical potential having a magnitude which varies, during an operating interval, continuously with time in a predetermined manner over a range of magnitudes including the magnitudes of both said first and said second electrical potentials; and a control network, responsive to said three electrical potentials and having an operation which is initiated only by said third electrical potential when the magnitude of said third electrical potential has a predetermined relationship with respect to the magnitude of at least one of said first and said second electrical potentials for adjusting the magnitude of said first electrical potential toward equality with that of said second electrical potential.

3. A control system comprising: means for supplying a first electrical effect of adjustable magnitude; an input circuit adapted to have applied thereto a second electrical effect; an input circuit adapted to have applied thereto only a third electrical effect having a magnitude which varies, during periodic operating intervals, continuously with time over a range of magnitudes including the magnitudes of both said first and said second electrical effects; and a control network, responsive to said three electrical effects and having an operation which is initiated only by said third electrical effect each time that the magnitude of said third electrical effect has a predetermined relationship with respect to the magnitude of at least one of said first and said second electrical effects for adjusting the magnitude of said first electrical effect toward equality with that of said second electrical effect.

4. A control system comprising: means for supplying a first electrical effect of adjustable magnitude; an input circuit adapted to have applied thereto a second electrical effect; an input circuit adapted to have applied thereto only a third electrical effect having a magnitude which varies sinusoidally over a range of magnitudes including the magnitudes of both said first and said second electrical effects; and a control network, responsive to said three electrical effects and having an operation which is initiated only by said third electrical effect when the magnitude of said third electrical effect has a predetermined relationship with respect to the magnitude of at least one of said first and said second electrical effects for adjusting the magnitude of said first electrical effect toward equality with that of said second electrical effect.

5. A control system comprising: means for supplying a first electrical effect of adjustable magnitude; an input circuit adapted to have applied thereto a second electrical effect; an input circuit adapted to have applied thereto only a third electrical effect having a magnitude which varies, during an operating interval, continuously with time in a predetermined manner over a range of magnitudes including the magnitudes of both said first and said second electrical effects; and a control network, responsive to said three electrical effects and having an operation which is initiated only by said third electrical effect when the magnitude of said third electrical effect exceeds the magnitude of the smaller of said first and said second electrical effects for adjusting the magnitude of said first electrical effect toward equality with that of said second electrical effect.

6. A control system comprising: means for supplying a first electrical effect of adjustable magnitude; an input circuit adapted to have applied thereto a second electrical effect having a magnitude which may vary over a period of time; an input circuit adapted to have applied thereto only a third electrical effect having a magnitude which varies, during an operating interval, continuously with time in a predetermined manner at a rate substantially greater than that of said second electrical effect and over a range of magnitudes including the magnitudes of both said first and said second electrical effects; and a control network, responsive to said three electrical effects and having an operation which is initiated only by said third electrical effect when the magnitude of said third electrical effect has a predetermined relationship with respect to the magnitude of at least one of said first and said second electrical effects for adjusting the magnitude of said first electrical effect toward equality with that of said second electrical effect.

7. A control system comprising: means for supplying a first electrical effect of adjustable magnitude; an input circuit adapted to have applied thereto a second electrical effect having a magnitude which may vary over a period of time; an input circuit adapted to have applied thereto only a third electrical effect having a magnitude which varies, during periodic operating intervals, continuously with time at a periodicity substantially greater than the highest periodicity of variation of said second electrical effect and over a range of magnitudes including the magnitudes of both said first and said second electrical effects; a control network, responsive to said third electrical effect and having an operation which is initiated only by said third electrical effect for periodically deriving a control effect when the magnitude of said third electrical effect has a predetermined relationship with respect to that of at least one of said first and said second electrical effects; and means responsive to said control effect for adjusting the magnitude of said first electrical effect substantially to equality with that of said second electrical effect.

8. A control system comprising: means for supplying a first electrical effect of adjustable magnitude; an input circuit adapted to have applied thereto a second electrical effect having a magnitude which may vary over a period of time; an input circuit adapted to have applied thereto a third electrical effect having a magnitude which varies, during periodic operating intervals, continuously with time at a periodicity substantially greater than the highest periodicity of variation of said second electrical effect and over a range of magnitudes including the magnitudes of both said first and said second electrical effects; a control network including at least one of a pair of rectifier devices, responsive to said three electrical effects and having an operation which is initiated only by said third electrical effect when the magnitude thereof has a predetermined relationship with respect to that of at least one of said first and said second electrical effects for periodically deriving a control effect; and means including at least one of a pair of electron-discharge devices responsive to said control effect for deriving an adjusting force and for applying said adjusting force to said first-mentioned means to adjust the magnitude of said first electrical effect substantially to equality with that of said second electrical effect.

9. A control system comprising: means including a potentiometer for supplying a first electrical effect of adjustable magnitude; an input circuit adapted to have applied thereto a second electrical effect having a magnitude which may vary over a period of time; an input circuit adapted to have applied thereto only a third electrical effect having a magnitude which varies, during periodic operating intervals, continuously with time at a periodicity substantially greater than the highest periodicity of variation of said second electrical effect and over a range of magnitudes including the magnitudes of both said first and said second electrical effects; a control network, responsive to said three electrical effects and having an operation which is initiated only by said third electrical effect when the magnitude thereof has a predetermined relationship with respect to that of at least one of said first and said second electrical effects for periodically deriving a control effect; and means responsive to said control effect for deriving an adjusting force and for applying said adjusting force to said potentiometer to adjust the magnitude of said first electrical effect substantially to equality with that of said second electrical effect.

CHARLES J. HIRSCH.

REFERENCES CITED

The following references are of record in the file of this patent:

UNITED STATES PATENTS

| Number | Name | Date |
|---|---|---|
| 2,435,965 | Hartig | Feb. 17, 1948 |
| 2,435,966 | Isserstedt | Feb. 17, 1948 |